May 12, 1959  R. W. KAZMAIER ET AL  2,885,732
SHAPING PLASTIC SHEETS

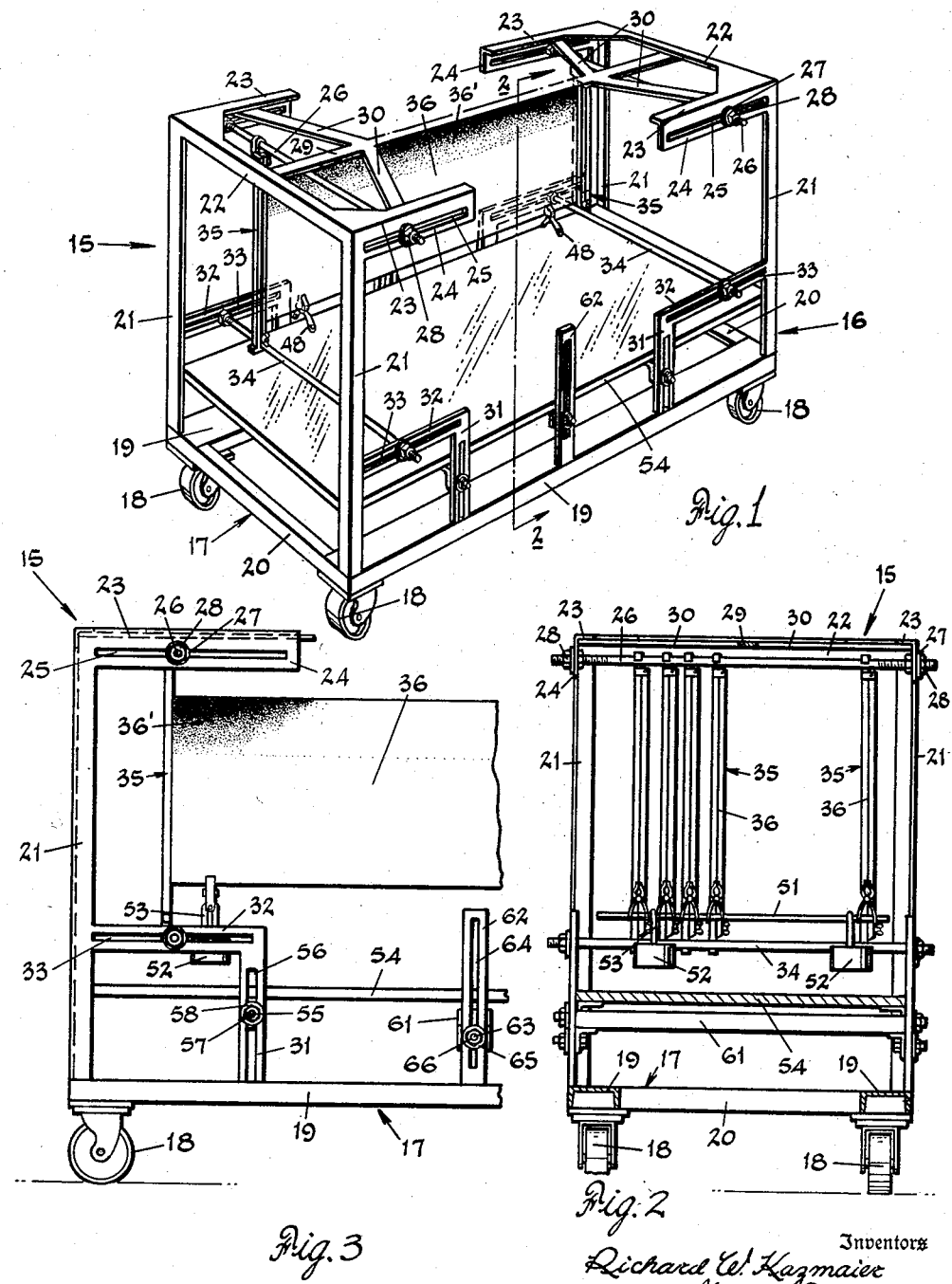

Filed March 22, 1954  3 Sheets-Sheet 2

Inventors
Richard W. Kazmaier
and Glenn Perry
By Nobbe & Swope
Attorneys

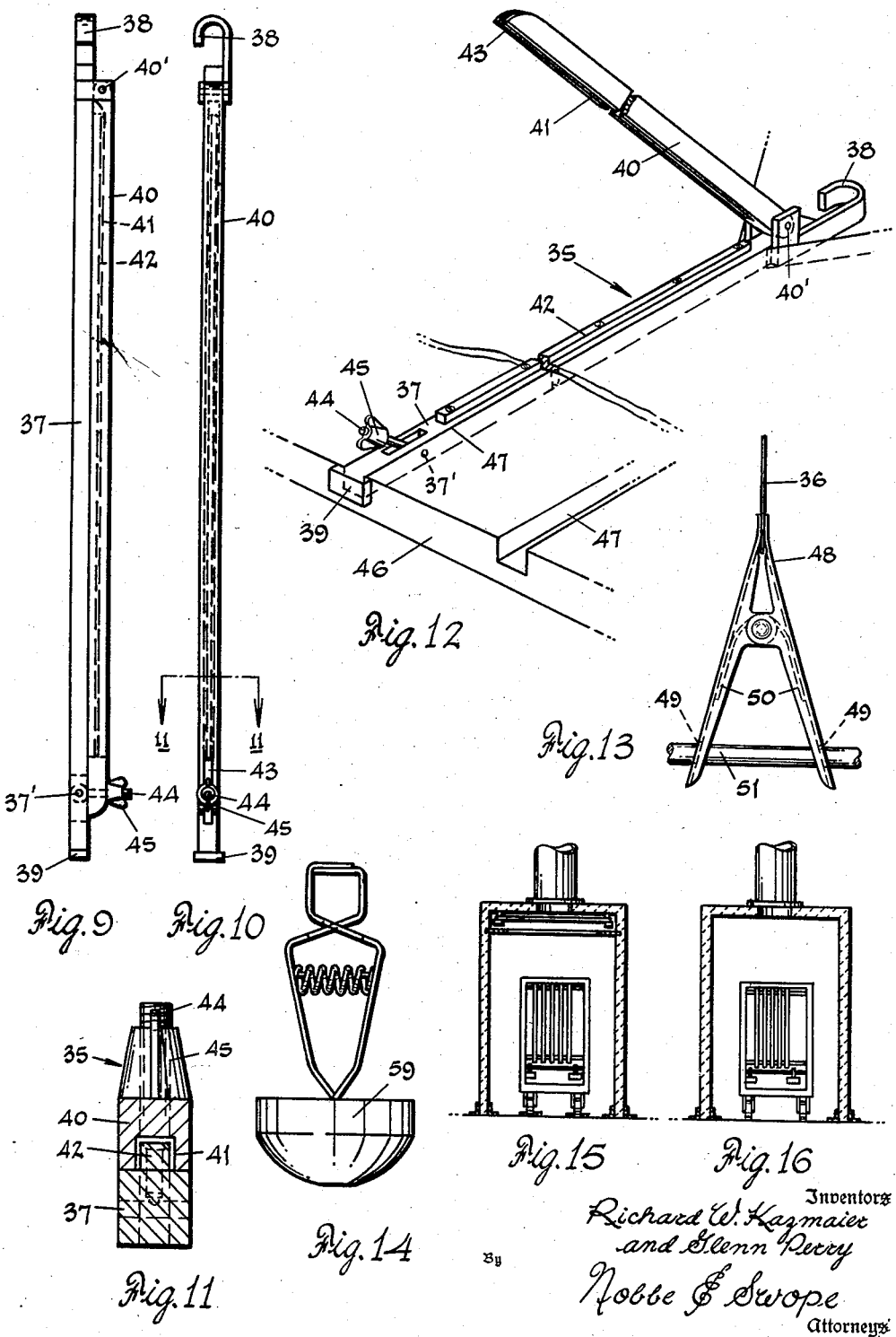

United States Patent Office 2,885,732
Patented May 12, 1959

2,885,732

SHAPING PLASTIC SHEETS

Richard W. Kazmaier, Maumee, and Glenn Perry, Toledo, Ohio, assignors to Libbey-Owens-Ford Glass Company, Toledo, Ohio, a corporation of Ohio Application March 22, 1954, Serial No. 417,672

8 Claims. (Cl. 18—19)

The present invention relates generally to the production of glare-reducing windows or the like, and more particularly to an improved method and apparatus for shaping the plastic interlayer for a curved laminated glass windshield when said interlayer has a glare-reducing portion.

This invention is concerned with all types of curved and angled windshields that are provided with glare-reducing bands and a windshield of this general character is disclosed in Patent No. 2,593,405, issued to Robert R. Beckham, April 22, 1952.

As explained in that patent, when interlayers for this type of windshield were colored and laminated together with bent sheets of glass in previously known ways, and then mounted at an angle in an automobile, it was found that the cut-off line at the bottom of the colored area was neither straight nor horizontal. Instead, it appeared in the bent windshield as a line which curved rather sharply down at the two opposite ends of the windshield.

The Beckham patent further describes how this difficulty can be overcome by distorting or shaping the colored plastic interlayer, prior to laminating, by the use of a flexible supporting frame and a rigid shaping frame. This patented procedure has proved satisfactory as far as the end result was concerned but presents certain production difficulties, especially with the newer windshield shape.

For example, the recently developed "panoramic" windshield is not only curved across the entire front of the automobile, and presents all of the difficulties encountered with the prior curved, one-piece windshields, but in addition curves sharply rearwardly at its ends to extend well into the corner and side areas of the automobile, and requires a considerably different shape of interlayer.

It is therefore an object of this invention to provide a new and improved method and apparatus for distorting interlayers that are to be used in these more complicated panoramic type windshields as well as interlayers that are to be used for windshields of the more simply curved type disclosed in the Beckham patent.

Another object is to provide a method and apparatus for simultaneously distorting a plurality of plastic interlayers.

Another object is to provide means whereby a plastic interlayer can be easily mounted in a distorting apparatus, and conversely may be easily detached therefrom.

A further object is to provide a distortion apparatus that will handle a plurality of plastic interlayers, the distortion of which is automatically controlled.

A further object is to provide a distortion apparatus that will interchangeably handle plastic interlayers of different lengths.

A still further object is to provide a distortion apparatus and method for interchangeably handling plastic interlayers with different degrees of required distortion.

Other objects and advantages of the invention will become more apparent during the course of the following description when taken in connection with the accompanying drawings.

In the drawings, wherein like numerals are employed to designate like parts throughout the same:

Fig. 1 is a perspective view of a form of distortion apparatus, constructed in accordance with the invention, and showing a colored plastic sheet in position for treatment;

Fig. 2 is a vertical sectional view taken substantially along the lines 2—2 of Fig. 1;

Fig. 3 is a fragmentary front elevation of one end of the apparatus of Fig. 1;

Fig. 9 is a side elevation of a clamping member or hanger for securing and supporting a plastic sheet in the distorting apparatus;

Fig. 10 is a front elevation of the bar shown in Fig. 9;

Fig. 11 is a sectional view taken substantially on the section lines 11—11 of Fig. 10;

Fig. 12 is a diagrammatic view of a set-up table showing the clamping bar of Fig. 9 in open position to receive the end of the plastic sheet;

Fig. 13 is a view of one type of clamp for use in distorting a plastic sheet;

Fig. 14 is a view of a different type of clamp with a weight attached thereto;

Fig. 15 is a transverse vertical section through a heating furnace with the distortion apparatus therein; and Fig. 16 is a transverse vertical section through a cooling furnace with the distortion apparatus therein.

Figure 4:
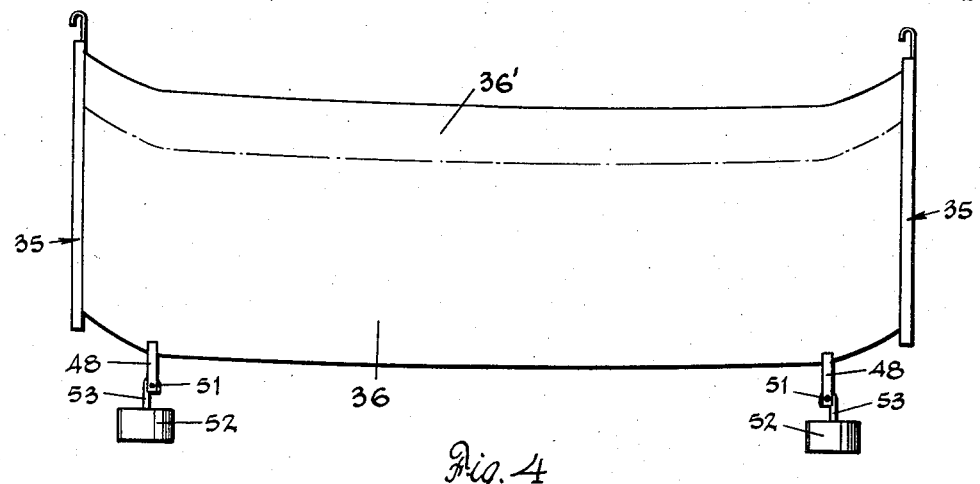
Fig. 4 is a diagrammatic showing of the manner of supporting a plastic sheet to be used in a panoramic type windshield, and of applying the distorting forces thereto.
Figure 5:
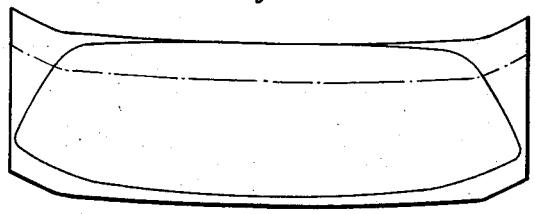
Fig. 5 is a view of the plastic sheet of Fig. 4 after it has been distorted and with the final windshield interlayer pattern traced thereon.
Figure 6:
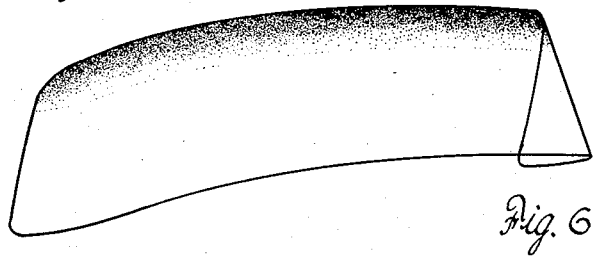
Fig. 6 is a perspective view of a finished glare-reducing panoramic windshield.

Briefly stated, the present invention contemplates the distortion or reshaping of a plastic sheet to produce an interlayer for a bent laminated glass windshield by first supporting the sheet along two opposite edges only to hold it in its normal shape, then applying tractive forces to one of the unsupported edges and simultaneously heating the sheet until it has been stretched or reshaped in the desired manner, and finally cooling the stretched and distorted sheet to semi-permanently fix it in its new shape.

Referring now more particularly to the drawings, there is illustrated in Fig. 1 a distorting apparatus or framework 15 produced in accordance with this invention. As here shown, this distorting apparatus comprises a substantially box-like supporting carriage 16, the base portion 17 of which is mounted on wheels 18 and is made up of two longitudinal parallel channel shapes 19 having their toes directed downwardly and weldably joined at their ends by angle-iron shapes 20. The base thus formed has its four corners upwardly directed angle-irons 21, the end pairs thereof being weldably joined at the upper extremities by cross pieces 22. At the joinder point of the vertical uprights 21 and the cross pieces 22 longitudinal interiorly directed angle-iron shapes 23 are weldably connected, said angle shapes having their top surfaces in the same horizontal plane and the downwardly directed surfaces 24 being in substantially parallel relationship.

Formed in the substantially vertical surfaces 24 are longitudinal slots 25, said slots being for the purpose of receiving therein the end portions of a pair of horizontally disposed rods 26, said end portions being threaded and having fastened thereon washers 27 and nuts 28, said washers and nuts yieldably and adjustably locking the aforesaid bars in the slots 25. Midway their ends, the cross pieces 22 are weldably connected by a longitudinal bracing strut 29, the end points of which are diagonally braced and weldably joined to the angle shapes 23 by bars 30. It is easily seen that the slots 25 allow the rods 26 to be slidably displaced in said slots to any desired position within the slot limits.

Projecting upwardly from the substantially end ¼ points of the channels 19 comprising the base, are bars 31, the upper ends thereof being joined to the vertical uprights 21 by horizontally directed members 32. Formed in members 32 are longitudinally directed slots 33 for the purpose of receiving therein the end portions of a second pair of horizontally disposed rods 34, substantially as described above, said rods being placed in substantially right-angle relationship with the slots 33 and slidably adjustable within the limits of said slots. Rods 26 and 34 are in substantially the same vertical plane and are provided in the distorting apparatus to carry and stabilize pairs of hanger-like clamping members 35, to be more specifically hereinafter described, and which are used to support the end portions of a plastic sheet 36 to be shaped. As already mentioned, the pairs of rods 26 and 34 are slidably adjustable in their respective slots 25 and 33. It is easily seen, therefore, that interlayer groups of different sizes may be handled by merely adjusting the rods to the necessary spacing for receiving thereon the clamping members 35 which secure opposite ends of the plastic sheet 36.

As best seen in Fig. 9, each clamping member 35 is made up of an elongated square shaped body portion 37 that is provided with a hook 38 at its upper end, a flange 39 at its lower end, and a clamping bar 40 pivoted thereto as at 40', just below the hook 38. The bar 40 is provided with a longitudinal mid slot 41, positioned to engage a rib 42 secured to the adjacent surface of the body portion 37, and an end slot 43 which is adapted to be entered by a bolt 44 pivoted to the body portion adjacent its lower end as at 37' and which is provided with a wing nut 45 to lock the clamping bar to the body portion.

As indicated above, in order to produce a plastic interlayer of the required distorted shape in accordance with the present invention, forces are preferably applied to the lower free edge of an oversize, generally rectangular sheet of plastic 36, from which an interlayer of the desired shape can subsequently be cut. To accomplish this, the sheet of plastic 36, which has been provided with a colored or shaded band 36' along one long margin thereof, first has its opposite short ends clamped between two of the clamping bars 35. For this purpose there may be provided a set-up table 46, illustrated diagrammatically in Fig. 12, and which has a plurality of transverse slots 47 cut into the surface thereof. The slots 47 are shaped to receive clamping members 35 as shown and are spaced from one another in a manner to permit pairs of these clamping members to be located on the table 46, at distances from one another that will accommodate different predetermined lengths of plastic sheeting.

With a pair of clamping members 35 positioned in the proper slots on the table 46, the shaded plastic sheet 36 is placed thereon, the end portions of said sheet falling on the body portion 37 of the clamping member or hanger 35. The clamping bar 40 is then lowered and the pivoted bolt 44 swung into the slot 43 in said clamping bar. Tightening the wingnut 45 locks the clamping bar 40 to the body portion 37 with the plastic therebetween. With the ends of the sheet gripped in the hangers 35, the sheet is placed in the distortion apparatus by placing the hook 38 of each hanger 35 over one of the rods 26, with the lower end of said hanger or clamping member being restrained by the rod 34 contacting the flange portion 39.

As seen in Figs. 1, 2 and 3, the distortion apparatus 15 is adapted to handle a plurality of interlayers. When adjusting the apparatus for the length of interlayer desired to be handled, it is readily seen that the rods 26 and 34 may be longitudinally adjusted in the slots 25 and 33, thereby automatically prepositioning said rods for the clamping members 35.

Since the clamping members 35 serve to secure the interlayer ends in a substantially vertical plane when mounted in the distortion apparatus 15, and said clamping members are of such a length (Fig. 4) as to grip therein the entire ends of the supported sheet 36, the application of pulling force to the lower edge of the vertically arranged sheet will cause said sheet to distort downwardly in the same vertical plane.

Now, of course, there are several ways, such as levers, springs, etc., of applying the required force to the lower edge of the supported interlayer. However, we prefer to do this by a relatively simple but novel method involving the use of weights. More specifically, clamps 48, such as shown in Fig. 13, may be attached to the lower edge of the plastic sheet 36, and said clamps may have axially aligned holes 49 formed in the legs 50 thereof to receive therethrough a rod 51 of sufficient length to engage a plurality of the clamps. With this arrangement, the distorting force may consist of a weight, or weights 52, having hooks 53 protruding therefrom, said hook serving to attach the weights to the rod 51. It may be seen in Fig. 4 that this method allows selective attachment of the weights 52 at any point along the lower edge of the sheet 36 and thereby, as more fully discussed later, makes possible a wide range of vertically distorted shapes.

To control the amount of distortion, means is included for stopping the downward movement of the weights 52 and also means for selectively presetting the length of this downward movement so that the final distorted shape may be accurately predetermined. For example, the weights 52 may be received as they move downwardly, by a substantially horizontal platform 54 (Figs. 1, 2 and 3), adjustably supported from the bars 31. More particularly, the platform 54 is carried upon rods 55 attached to the lower surface thereof intermediate its ends, and the ends of these rods are received within slots 56 formed in the bars 31. Nuts 57 are threaded onto the ends of the rods 55 and, together with washers 58, provide means for adjustably clamping the rods to the bars 31. In use, the platform 54 is clamped at a predetermined vertical distance downward from the weights 52, said distance being determined by the amount of distortion required. After the interlayers have been placed in the distortion frame, the frame is wheeled into a heating furnace, seen in Fig. 15, where the temperature is brought up to approximately 210 degrees. The action of heat and the pull of the weights causes the interlayers to distort downwardly until the weights are stopped by the selectively preset platform 54. After full distortion is effected, the frame is wheeled to a cooling furnace, seen in Fig. 16, where the temperature is then brought from the approximate 210 degrees in the heating furnace to room temperature which acts to "set" the distorted sheets in their new shape.

After removal from the cooling furnace, and as seen in Fig. 16, the final windshield interlayer is cut from the slightly oversize distorted plastic sheet. Where the plastic sheeting employed possesses "elastic memory," the distortion produced is not permanent, but lasts until, under normal production schedules, the interlayer is sandwiched between glass sheets and pressurized to form a final windshield.

The foregoing distortion procedure has been primarily concerned with distortion of an interlayer as used in the so-called panoramic or "hook-type" windshield. However, as already indicated, the distortion frame of this invention may also be used to produce distorted interlayers for more conventionally curved windshields.

Figure 7:
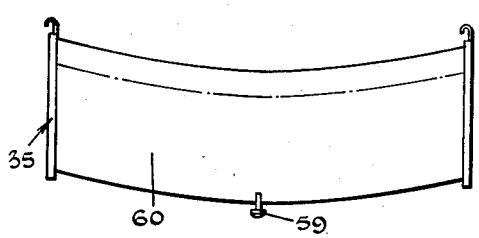
Fig. 7 is a diagrammatic showing similar to Fig. 4 but of a plastic sheet that is to be used in a windshield of the general type disclosed in the Beckham patent.
Figure 8:
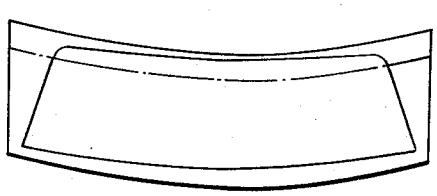
Fig. 8 is a view of the sheet of Fig. 7 after it has been distorted and with the final windshield interlayer pattern traced thereon.

Thus, as best seen in Fig. 7, when distorting interlayers of the relatively simpler shapes disclosed in the Beckham patent, a weight 59, shown in Fig. 14, may be clampedly attached to the midpoint of a rectangular plastic sheet 60, while the end portions thereof are being held by clamping members 35, which in turn are supported by the rods 26 and 34 of the apparatus 15, as previously described. To limit the downward distortion of the interlayer 60 under the combined action of the weight 59 and heat, the platform 54 may be removed and a weight receiving member 61, which is disposed at substantially right-angle relationship to the midpoints of the longitudinal channels 19 and supported thereby with bars 62 (Figs. 1 to 3), may be employed.

More specifically, and as best seen in Fig. 3, the member 61 is carried by bolts 63, said bolts being adjustably received by slots 64 in the substantially vertical bars 62. The end portions of the bolts 63 have washers 65 and nuts 66 adjustably clamping said bolts to the bars 62. In use, as before described, the interlayer 60 distorts downwardly and the weight 59 movement is arrested by the weight receiving member 61.

Although the present invention has been specifically described in connection with only two general types of curved windshields, it will be obvious that colored plastic interlayers may be shaped by the teachings of this invention to fit into any type of curved and angled windshield and to still exhibit a colored or neutrally shaded glare-reducing area having a substantially straight horizontal cut-off line. Looking at Fig. 4, for example, it is easily seen that the weights may be applied at any point along the lower edge of the plastic interlayer 36, in Fig. 1, it is noticed that the weight receiving platform substantially fills the supporting carriage; therefore, the weights may be attached at various points along the interlayer edge to produce various distorted shapes. In fact, more than the two sets of weights shown in the drawings may be used although in producing an interlayer for the panoramic or "hook-type" windshield with which this invention is primarily concerned the method illustrated is preferred. It is therefore to be understood that the form of the invention herewith shown and described is to be taken as an illustrative embodiment only of the same and various changes may be resorted to without departing from the spirit of the invention or the scope of the subjoined claims.

We claim:

1. An apparatus for changing the original shape of a plastic sheet, comprising a stretching framework, clamping members carried by said framework and engageable with opposite ends of a plastic sheet to support the same within the framework, weights vertically movable within said framework in a direction perpendicular to an edge of the sheet extending between said clamping members, said weights applying a tractive force to the sheet only in a direction parallel to the plane of the sheet, means for attaching said weights to a plastic sheet when supported within the framework, and means for interrupting the vertical movement of said weights.

2. An apparatus according to claim 1 in which each of said clamping members comprises a body portion, a clamping bar movable relative to said body portion to grip an end of the plastic sheet therebetween, and means for locking said clamping bar to said body portion.

3. An apparatus according to claim 2 in which the body portion is provided with a rib engageable with a slot in the clamping bar, and the clamping bar is pivotally associated with the body portion.

4. In a method for changing the original shape of a plastic sheet to a second shape, the steps of supporting said sheet while in the original shape in a vertical plane by engaging only the two opposite edges of said sheet, and applying a tractive force to a non-engaged edge in a direction perpendicular to the non-engaged edge and in the plane of the sheet whereby the sheet is stretched to the second shape.

5. In a method as defined in claim 4, wherein equal tractive forces are applied to at least two independent separated points of the non-engaging edge.

6. In a method as defined in claim 4, including applying heat to the entire sheet only during the application of the tractive forces to the non-supported edge.

7. In a method as defined in claim 6, wherein the sheet is heated for a predetermined time period sufficient to cause the sheet to remain in a semiplastic condition only until the tractive force has deformed the sheet into the second shape, discontinuing the tractive force at the end of the predetermined time period, and cooling the sheet to set the same in the second stage.

8. An apparatus for changing the original shape of a plastic sheet to a second shape, including means engaging two opposite edges only of the sheet for supporting said sheet in its original shape in a vertical plane, and means for applying to a non-supported edge of the sheet a tractive force in a direction perpendicular to the non-supported edge and in the plane of the sheet whereby the sheet assumes a second shape under action of the tractive force.

References Cited in the file of this patent

UNITED STATES PATENTS

| 833,436 | Borland et al. | Oct. 16, 1906 |
| 2,189,006 | Hutchinson | Feb. 6, 1940 |
| 2,239,546 | Black et al. | Apr. 22, 1941 |
| 2,700,007 | Dennison et al. | Jan. 18, 1955 |

FOREIGN PATENTS

| 464,436 | Great Britain | Apr. 19, 1937 |

UNITED STATES PATENT OFFICE

CERTIFICATE OF CORRECTION

Patent No. 2,885,732

May 12, 1959

Richard W. Kazmaier et al.

It is hereby certified that error appears in the printed specification of the above numbered patent requiring correction and that the said Letters Patent should read as corrected below.

Column 2, line 65, after "has" insert -- at --; column 3, line 11, after "end" insert -- 1/4 --.

Signed and sealed this 1st day of September 1959.

SEAL)
ttest:

ARL H. AXLINE
testing Officer

ROBERT C. WATSON
Commissioner of Patents